(12) United States Patent
Dumarey (10) Patent No.: US 9,510,512 B2
(45) Date of Patent: Dec. 6, 2016

(54) PICKUP FOR AN AGRICULTURAL MACHINE

(75) Inventor: Robrecht M. K. Dumarey, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 111 days.

(21) Appl. No.: 14/110,178

(22) PCT Filed: Mar. 27, 2012

(86) PCT No.: PCT/EP2012/055412
§ 371 (c)(1),
(2), (4) Date: Jan. 9, 2014

(87) PCT Pub. No.: WO2012/136515
PCT Pub. Date: Oct. 11, 2012

(65) Prior Publication Data
US 2014/0123617 A1    May 8, 2014

(30) Foreign Application Priority Data

Apr. 8, 2011 (BE) .................................. 2011/0212

(51) Int. Cl.
*A01D 89/00* (2006.01)

(52) U.S. Cl.
CPC ........... *A01D 89/002* (2013.01); *A01D 89/008* (2013.01)

(58) Field of Classification Search
CPC .... A01D 89/00; A01D 89/004; A01D 89/005; A01D 89/006; A01D 89/008; A01F 15/08; A01F 15/106
See application file for complete search history.

(56) References Cited

U.S. PATENT DOCUMENTS

| 2,571,489 | A | * | 10/1951 | Russell | A01F 15/101 100/139 |
| 2,647,355 | A | * | 8/1953 | Luke | A01D 89/00 100/142 |
| 2,691,266 | A | * | 10/1954 | Meyer | A01D 41/10 56/341 |
| 2,872,772 | A | * | 2/1959 | Nolt | A01D 89/008 56/364 |
| 3,747,313 | A | * | 7/1973 | Denzin | A01D 89/002 15/179 |
| 4,304,090 | A | * | 12/1981 | Gavrilenko | A01D 89/00 56/190 |
| 4,411,127 | A | * | 10/1983 | Diederich, Jr. | A01D 89/008 56/364 |

(Continued)

FOREIGN PATENT DOCUMENTS

EP        1252813 A1    10/2002

*Primary Examiner* — Alicia Torres
*Assistant Examiner* — Adam Behrens
(74) *Attorney, Agent, or Firm* — Patrick M. Sheldrake (57) ABSTRACT

A pick-up assembly for an agricultural machine having a pick-up drum rotatably mounted in a frame; a windguard mounted at a free end of two lateral support arms, the two lateral support arms pivotably mounted at their other end to the frame; a crossbar having tines mounted at one end to the crossbar, the crossbar pivotably mounted to the support arms for allowing a range of free movement of the free extremities of the tines between an upper limit and a lower limit wherein two elongate flexible tension elements are connected at one end eccentrically to the crossbar and at their other end to the frame.

9 Claims, 5 Drawing Sheets

(56) References Cited

U.S. PATENT DOCUMENTS

| | | | | |
|---|---|---|---|---|
| 4,516,389 A * | 5/1985 | Core | A01F | 15/106 100/13 |
| 5,293,732 A * | 3/1994 | Vogelgesang | A01D | 89/008 56/119 |
| 6,295,797 B1 * | 10/2001 | Naaktgeboren | A01D | 89/008 56/341 |
| 6,688,092 B2 * | 2/2004 | Anstey | A01D | 89/008 56/220 |
| 6,877,304 B1 * | 4/2005 | Smith | A01F | 15/106 56/341 |
| 7,650,741 B2 * | 1/2010 | Graber | A01D | 89/005 56/341 |
| 7,654,069 B1 * | 2/2010 | Dunham | A01D | 89/008 56/190 |
| 7,716,910 B2 * | 5/2010 | Woodford | A01F | 15/106 56/190 |
| 7,823,371 B2 * | 11/2010 | Gantzer | A01D | 89/008 56/190 |
| 7,877,974 B2 * | 2/2011 | McLean | A01D | 43/10 56/189 |
| 8,186,137 B2 * | 5/2012 | Viaud | A01D | 89/008 56/190 |
| 2003/0131575 A1 * | 7/2003 | Anstey | A01D | 89/008 56/16.4 R |
| 2006/0277888 A1 * | 12/2006 | Erdmann | A01D | 89/008 56/344 |
| 2008/0163600 A1 * | 7/2008 | Schrag | A01D | 89/005 56/341 |
| 2008/0163601 A1 * | 7/2008 | Graber | A01D | 89/005 56/341 |
| 2009/0100814 A1 * | 4/2009 | Egging | A01D | 89/008 56/1 |
| 2010/0043370 A1 * | 2/2010 | Viaud | A01F | 15/106 56/14.5 |
| 2014/0250855 A1 * | 9/2014 | Vandamme | A01D | 89/008 56/379 |
| 2014/0260167 A1 * | 9/2014 | McClure | A01D | 89/008 56/190 |

* cited by examiner

PICKUP FOR AN AGRICULTURAL MACHINE

This application is the US National Stage filing of International Application Serial No. PCT/EP2012/055412 filed on Mar. 27, 2012 which claims priority to Belgium Application BE2011/0212 filed Apr. 8, 2011, each of which is incorporated herein by reference in its entirety.

TECHNICAL FIELD

The present invention relates to a pickup for an agricultural machine.

BACKGROUND ART

Certain agricultural machines, such as balers and forage harvesters, are required to pick up crop material that has been cut but still lies on the ground. The mechanism used to gather the crop material from the ground and feed it into the machine for processing is known as, and herein referred to as, a pickup. A pickup typically comprises a drum rotatably mounted on a frame and having radially projecting spikes to drive the crop material upwards, past a guide (that is termed a windguard) and then into a feed channel through which the crop material is conveyed into the machine for processing.

A known design of windguard comprises a roller extending transversely across the width of the pickup located above and forward of the drum. The windguard is mounted on its opposite ends on two support arms that are pivotable relative to a frame of the pickup so that the gap between the roller and the drum increases as the flow of crop material increases. Instead of a rotating roller, the windguard may comprise a plate or shield to act as a deflector, but a roller is preferred as it offers less resistance to the crop flow.

To guide and contain the crop material after it has passed the windguard, it is known to provide a guide in the form of tines that extend parallel to the direction of crop flow, the tines being mounted on a crossbar secured to the two support arms carrying the windguard. Classically, the crossbar and the tines are secured in such manner that they do not move relative to the support arms of the windguard. This, however, leads to a problem in that as the windguard rises to increase the gap between itself and the drum, the support arms on which it is carried pivot upwards and this in turn alters the inclination of the tines. The inclination of the tines results in a funnel effect that reduces the depth of the crop flow path downstream from the windguard.

EP 1 252 813 addresses this problem by allowing the crossbar on which the tines are mounted to pivot relative to the support arms of the windguard. In one embodiment disclosed in EP 1 252 813, the tines can pivot freely downwards by the action of gravity and upwards by the crop flow. Abutment stops are provided to limit the angular range of movement of the tines. In a second disclosed embodiment, a linkage connected to the crossbar and the frame of the pickup holds the tines firmly so that they cannot move freely but the angular position of the tines relative to the support arms of the windguard varies as the windguard rises and falls.

In the first embodiment of EP 1 252 813, the tines can move in order to accommodate surges in the flow of crop material by allowing a range of free movement of the tines for enlarging the depth of the crop flow path. The lower limit of the crop however still follows the same path of motion as in the design with a secured crossbar and as such in the first embodiment the tines still create the funnel effect which obstructs the flow of the crop and increases the resistance to crop flow.

In the second embodiment of EP 1 252 813, the movement of the tines is linked in a fixed relation to the movement of the support arms and in this way avoids the funnel effect. In this way the funnel effect and the associated flow resistance are reduced, but as they are devoid of a free range of movement they cannot accommodate a sudden surge in the flow quickly and as a result a blockage may still occur.

Therefore there still exists a need for a system that can achieve both effects simultaneously, namely allowing a free range of movement for allowing a quick reaction to a sudden surge of crop material and avoiding the funnel effect.

DISCLOSURE OF INVENTION

It is an object of embodiments of the present invention to provide a good pickup for an agricultural machine, more particularly a good windguard there for.

The above objective is accomplished by a device according to the present invention.

According to the present invention, there is provided a pick-up assembly for an agricultural machine comprising:
- a pick-up drum rotatably mounted in a frame;
- a windguard extending transversally to an intended direction of crop flow mounted forward and/or above the drum at a free end of two lateral support arms, the two lateral support arms being pivotably mounted at their other end to the frame;
- a crossbar extending transversally to the intended direction of crop flow, the crossbar comprising a plurality of tines mounted at one end to the crossbar and projecting with their free end downstream in the intended direction of crop flow, the crossbar being pivotably mounted to the two lateral support arms for allowing a range of free movement of the free end of the tines between an upper limit and a lower limit. The pick-up assembly further comprises two elongate flexible tension elements being connected at one end eccentrically to the crossbar and at their other end to the frame. The two tension elements are configured such that they control respectively the lower limit and the upper limit of the range of movement of the tines in function of an angle of rotation of the support arms.

The invention allows the advantages offered by both the solutions proposed in EP 1 252 813 to be achieved at the same time. In particular, the tines are automatically pivoted relative to the windguard support arms in a direction to increase the separation of their free ends from the drum, and thereby deepen the crop flow path, as the windguard rises to increase its separation from the drum. However, the tension elements used to raise the tines also allow a for a range of free movement to accommodate surges in the crop flow rate.

Thus, whereas as the linkage connecting the crossbar to the frame in EP 1 252 813 uniquely sets the attitude of the tines for a given position of the windguard support arms, in the present invention, the flexible tie serves only to set the upper and lower limits for a range of movement of the tines.

In embodiments of the present invention, the ties may be flexible cord or cables but they may alternatively be formed as chains.

In a pick-up assembly according to embodiments of the present invention, the lower limit of the range of movement of the tines may be controlled such that the height of the crop flow path in the vicinity of the free ends of the tines does not decrease when the angle of rotation of the support arms increases. Similarly, in a pick-up assembly according to embodiments of the present invention, the upper limit of the range of movement of the tines may be controlled such that the height of the crop flow path in the vicinity of the free ends of the tines does not decrease when the angle of rotation of the support arms increases. This accommodates a sudden surge in the crop flow quickly and as a result prevents blockage of the pick-up assembly.

In order to obtain the above control of movement of the tines, a pick-up assembly according to embodiments of the present invention may include that both ends of any of the tension elements are connected at a same side of a plane defined by the crossbar and an axis of rotation of the support arms. Both ends of one tension element may be connected at a first side of the plane defined by the crossbar and the axis of rotation of the support arms, while both ends of the other tension element may be connected at the other side of that plane.

In a pick-up assembly according to embodiments of the present invention, the lower limit and the upper limit of the range of movement of the tines in function of an angle of rotation of the support arms may be controlled by controlling fixation point locations of first ends of flexible tension elements with respect to the crossbar, and by controlling fixation point locations of second ends of flexible tension elements with respect to a rotation point of the support arms. The actual fixation point locations with respect to the rotation axes determine suitable length ranges of the flexible tension elements. The actual fixation point locations in combination with a selected length of the flexible tension elements determine the actual allowable range of movement of the tines.

In a pick-up assembly according to embodiments of the present invention, the two elongate flexible tension elements which are connected at one end eccentrically to the crossbar, are connected to a crank arm. The crank arm may be fixedly connected to the crossbar.

In a pick-up assembly according to embodiments of the present invention, the tines may be fixedly connected to the crossbar.

Particular and preferred aspects of the present invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF DRAWINGS

The invention will now be described further, by way of example, with reference to the accompanying drawings, in which.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

MODE(S) FOR CARRYING OUT THE INVENTION

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to agricultural balers, reference is made to machines for forming bales from agricultural crop material, such as forming rectangular bales by any suitable means, e.g. plungers and press-boxes, or forming cylindrical bales, e.g. by winding and pressing.

Where in embodiments of the present invention reference is made to a windrow pickup, it is understood that reference is made to an assembly which is adapted for picking up a windrow and feeding it into a subsequent processing unit, e.g. a baling chamber, of an agricultural machine, for example an agricultural harvesting machine.

Where in embodiments of the present invention reference is made to a windguard, reference is made to a device that ensures that crop material is properly fed into the baling chamber in spite of any wind or varying crop conditions. Typically, the windguard comprises a pipe and a series of tines affixed thereto, held in position above and in front of the pickup. The pipe may be raised or lowered by adjusting an adjustment mechanism.

Where in embodiments of the present invention reference is made to crop material, reference is made to any suitable type of biomass that can be harvested and packed in bales, such as for example hay, silage, straw or other.

Figure 1:
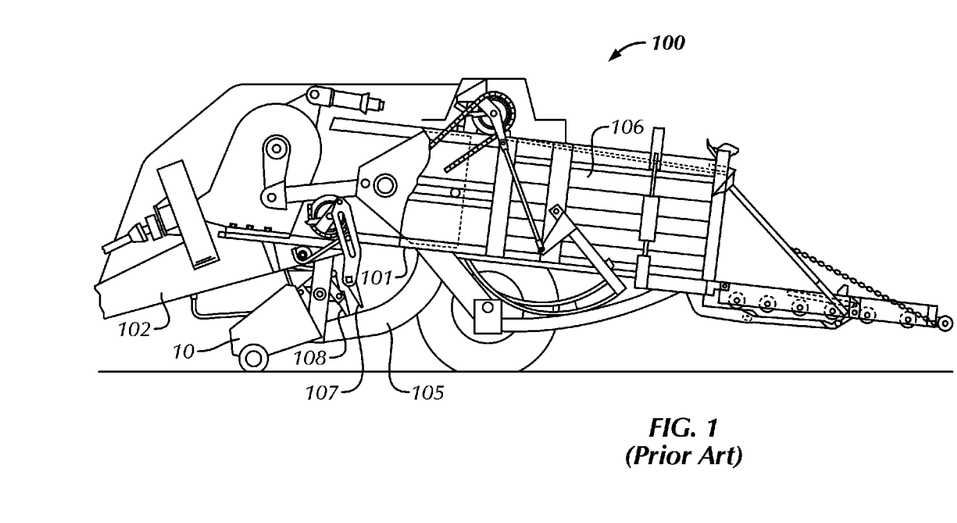
FIG. 1 is a schematic representation of a square baler, as one type of agricultural machine onto which a pick-up assembly according to embodiments of the present invention may be used.

Referring to the drawings, as an example only FIG. 1 shows a prior art agricultural baler 100 comprising a frame 101 which is equipped with a forwardly extending tongue 102 at its front end with hitch means (not shown) for coupling the baler 100 to a towing tractor. A pick-up assembly 10 lifts windrowed crop material off the field as the baler 100 is travelled there over and delivers such material into the front end of a rearwardly and upwardly curved, charge-forming feeder duct 105. The duct 105 communicates at its upper end with an overhead, fore-and-aft extending bale-forming chamber 106 into which crop charges are loaded by a cyclically operating stuffer mechanism 107. The bale-forming chamber 106 illustrated is one of a rectangular baler, the invention, however, not being limited thereto. In alternative embodiments, the bale-forming chamber could be one of a round baler. In yet alternative embodiments, the pick-up assembly 10 could be coupled to an agricultural machine which is not a baler, but which nevertheless accepts picked-up crop material, such as for example a forage harvester or a combine harvester.

A continuously operating packer mechanism 108 at the lower front end of the feeder duct 105 continuously feeds and packs material into the duct 105 as to cause charges of the crop material to take on and assume the internal configuration of the duct 105 prior to periodic engagement by the stuffer mechanism 107 and insertion up into the bale-forming chamber 106. The feeder duct 105 may be equipped with means (not illustrated) for establishing whether a complete charge has been formed therein and operating the stuffer mechanism 107 in response thereto. Each action of the stuffer mechanism 107 introduces a "charge" or "flake" of crop material from the duct 105 into the chamber 106.

Generally, a tractor pulls the baler 100 over a windrow of previously cut crop. The pick-up assembly 10 in co-operation with the charge feeder duct 105 inserts the crop into the baling-forming chamber 106. When the bale-forming chamber 106 is full, a wrapping system engages and wraps the bale. Once the bale is wrapped, it is ejected from the bale-forming chamber 106.

Figure 2:
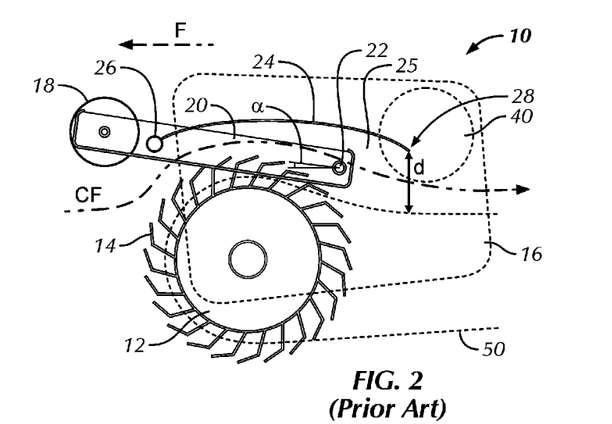
FIG. 2 is a schematic representation of a conventional pick-up assembly, with the windguard in a low position.
Figure 3:
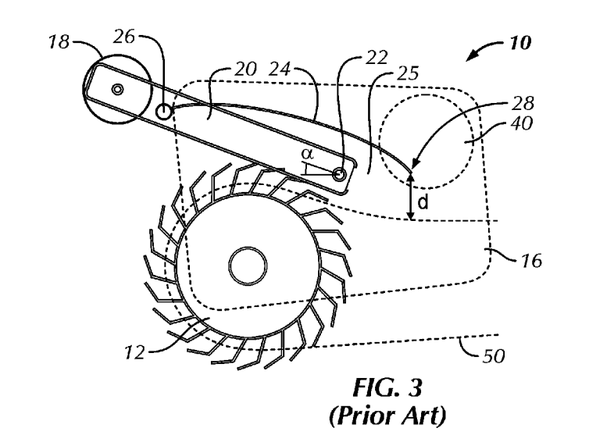
FIG. 3 shows the conventional pick-up assembly shown in FIG. 2 when the windguard is raised to accommodate an increased crop flow rate.

FIGS. 2 and 3 are schematic representations of a conventional pick-up assembly 10 having a main drum 12 with projecting spikes 14 that is rotatably mounted on a frame 16. A windguard 18 is provided forward of the main drum 12, with respect to an intended direction of crop flow (the forward direction being indicated with arrow F in FIG. 2), and at a level higher than the axis of rotation of the main drum 12. The windguard 18 is constructed as a roller supported at each of its opposite ends on a support arm 20. The windguard 18 extends transversally to the intended direction of crop flow. The support arms 20 are pivotable relative to the frame 16 of the pickup 10, e.g. about pins 22.

The windguard 18 is mounted at a free end of the support arms 20 opposite the ends where the arms 20 are pivotable, e.g. about the pins 22. Spaced tines 24 extending in the intended direction of crop flow act as a guide along a guide floor 50, comprising for example plates such as e.g. metal plates for guiding crop material, to define a crop flow channel 25 downstream of the windguard 18. The tines 24 are secured to a crossbar 26 which is in turn rigidly secured to the support arms 20 carrying the windguard 18. The crossbar 26 extends transversally to the intended direction of crop flow. Two augers 40 are arranged one on each side of the pick-up assembly 10 (in a transversal direction thereof) to push crop towards the centreline of the pickup 10 in transversal direction. The extremities 28 of the tines 24 terminate in the space between the two augers 40.

Figure 4:
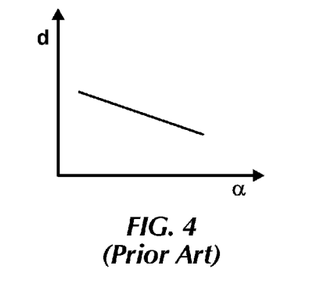
FIG. 4 shows the relationship between the angle $\alpha$ and the height d for the conventional embodiment shown in FIGS. 2 and 3.
Figure 5:
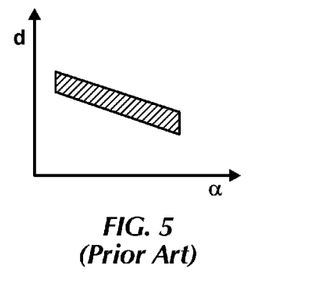
FIG. 5 shows the relationship between the angle $\alpha$ and the height d for the first conventional embodiment mentioned in EP 1 252 813.

From a comparison of FIGS. 2 and 3, it will be seen that though the windguard 18 has risen in FIG. 3 compared to FIG. 2 to increase the depth of the crop flow path 25, the tines 24 have been tilted downwards, resulting in a funnel effect reducing the depth of the crop flow path 25 downstream of the windguard 18. The relationship between the angle $\alpha$ of the two arms 20 relative to a horizontal plane and the vertical depth d of the crop flow path 25 at the extremities 28 of the tines 24 is graphically depicted in FIG. 4. This problem is overcome in EP 1 252 813 by allowing the crossbar 26 to rotate relative to the support arms 20. In one embodiment proposed in the latter patent, the tines 24 can pivot freely but their range of movement is limited by stops. The relationship between the angle $\alpha$ and the depth d of the crop flow path is graphically depicted in FIG. 5, where the fixed range of free movement imposed by the stops contributes additively to the $\alpha$-d relationship as depicted in FIG. 4.

Figure 6:
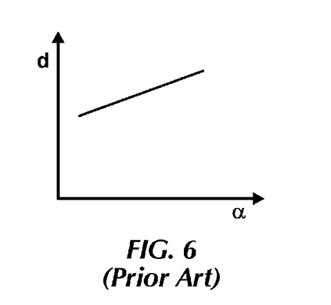
FIG. 6 shows the relationship between the angle $\alpha$ and the height d for the second conventional embodiment mentioned in EP 1 252 813.

In a second embodiment of the latter patent, a rigid linkage is provided to rotate the tines 24 anticlockwise (as viewed in FIG. 3) relative to the support arms 20 as the arms 20 rotate clockwise relative to the frame 16. In the second embodiment, the tines 24 occupy a fixed position in any given position of the support arms 20 and the windguard 18. The rigid linkage allows an increase of depth d when the angle $\alpha$ increases, as graphically depicted in FIG. 6.

An embodiment of the present invention is shown schematically in four different positions in FIGS. 7 to 10. The crossbar 26 is mounted such that it is allowed to rotate relative to the support arms 20. The tines 24 are fixedly attached to the crossbar 26. In accordance with embodiments of the present invention, a crank arm 30 is secured to the crossbar 26 to limit the rotation of the crossbar 26 relative to the support arms 20 carrying the windguard 18. Opposite parts of the crank arm 30 with respect to the connection point of the crank arm 30 to the crossbar 26 or vice versa, e.g. opposite ends of the crank arm 30, are tied by flexible ties 32 and 34 to points on the frame 16. The ties 32 and 34 are elongate flexible tension elements, and may for example be cords, cables or chains. The elongate flexible tension elements 32, 34, further called flexible ties for particular embodiments of the present invention and for sake of ease, are connected at one end 321, 341 eccentrically to the crossbar 26, for example at a first and a second part of the crank arm 30, respectively, e.g. at a first and a second end thereof, and at their other end 322, 342 the elongate flexible tension elements 32, 34 are connected to the frame 16. Both ends of an elongate flexible tensioning element 32, 34 may be connected at a same side of a plane defined by the crossbar 26 and an axis of rotation of the support arms 20, e.g. defined by pins 22. In the example illustrated, both ends 321, 322 of tensioning element 32 are connected to the crank arm 30 and the frame 16, respectively, below the plane defined by the crossbar 26 and an axis of rotation of the support arms 20. Both ends 341, 342 of tensioning element 34 are connected to the crank arm 30 and the frame 16, respectively, above the plane defined by the crossbar 26 and an axis of rotation of the support arms 20. The connection of the elongate flexible tension elements 32, 34 to the crank arm 30 and to the frame 16 may be performed in any suitable way.

In accordance with embodiments of the present invention, the flexible tension elements 32, 34 are configured, e.g. parameters thereof are selected, such that they control respectively the lower limit and the upper limit of the range of movement of the tines 24 in function of an angle of rotation a of the support arms 20. Such parameters may for example be the length of the flexible tension elements 32, 34, their strength, their elasticity, their elongation coefficient, etc. In principle the flexible tension elements 32, 34 are not elastic, i.e. they cannot be stretched. Other parameters of the flexible tension elements 32, 34 are the position of the ends 321, 322, 341, 342 onto the frame. Then first ends 321, 341 of the first and second flexible tensioning elements 32, 34, respectively, are fixed on the excenter arms of the crank arm 30, i.e. not coinciding with the rotation point defined by the crossbar 26. The second ends 322, 342 of the first and second flexible tensioning elements 32, 34, respectively, are fixed on the frame 16, away from the rotation point of arm 20 defined by the pins 22. The relative position of the second ends 322, 342 with respect to the rotation point of arm 20, in combination with the length of the excenter arm between the fixation point of the first ends 321, 342 with respect to the rotation point of crossbar 26, and in combination with the length of the first and second flexible tensioning elements 32, 34 defines the allowed range of movement of the tines 24, and may thus be selected so as to allow the tines 24 to move within an acceptable range. Structurally, the connection of the first end 321 and the second end 322 of the first flexible tensioning element 32 should be placed at a same side of a plane defined by the crossbar 26 and an axis of rotation 22 of the support arms 20. The connection of the first end 341 and the second end 342 of the second flexible tensioning element 34 should be placed at a same side of the plane defined by the crossbar 26 and an axis of rotation 22 of the support arms 20. The connection of the ends 321, 322 of the first flexible tensioning element 32 and the ends 341, 342 of the second flexible tensioning element 34 should be located at different sides of the plane defined by the crossbar 26 and an axis of rotation 22 of the support arms 20.

Figure 7:
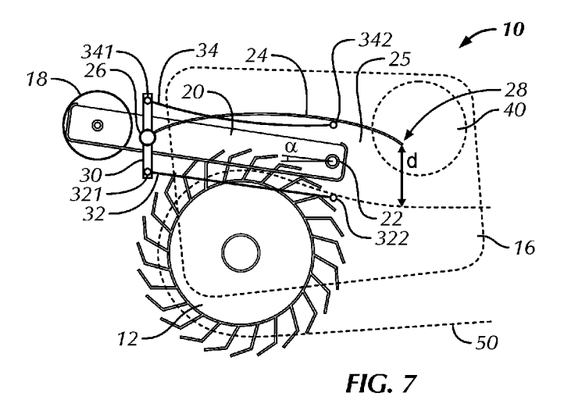
FIG. 7 shows a pick-up assembly constructed in accordance with embodiments of the present invention.

In the lowered position of the windguard 18, as illustrated in FIG. 7, the crossbar 26 and the tines 24 take on a particular position, determined by the fact that flexible tie 32 is taut, as illustrated, and hence does not allow crank arm 30 to rotate so as to allow the tines 24 to move their extremities 28 further downwardly. In this position, the crank arm 30 may be placed substantially vertical, e.g. vertical. The flexible tie 32 at the bottom part, e.g. at the bottom extremity, of the crank arm 30 is tightened, while the flexible tie 34 at the top part, e.g. at the top extremity, of the crank arm 30 is provided with some slack.

Figure 8:
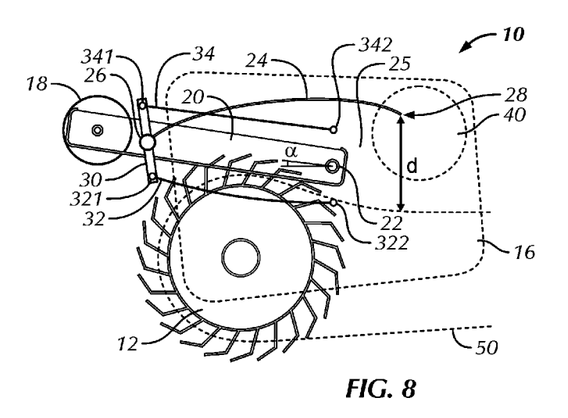
FIG. 8 shows the pick-up assembly of FIG. 7 when the tines of the windguard are raised in accordance with embodiments of the present invention to accommodate a sudden temporary increase in crop flow rate.

FIG. 8 shows the pick-up assembly of FIG. 7 when the tines of the windguard are raised to accommodate a sudden temporary increase in crop flow rate. The crop flow pushes the tines 24 upwardly. This upward movement of the tines 24 makes the crossbar 26, to which the tines 24 are fixedly connected, rotate with respect to the support arms 20, in a counterclockwise direction for the embodiment as viewed in FIGS. 7 and 8. As a crank arm 30 is secured to the crossbar 26 in accordance with embodiments of the present invention, this crank arm 30 will undergo a same rotational movement as the crossbar 26, which is a rotation in a counterclockwise direction for the embodiment as viewed in FIGS. 7 and 8. The rotation of the crank arm 30, however, is limited by the flexible ties 32, 34. In the embodiment illustrated and described hereinabove, the flexible tie 34 at the top part, e.g. at the top extremity, will become taut, thus preventing further rotation of the crank arm 30. As the further rotation of the crank arm 30 is prevented, also further rotation of the crossbar 26 is prevented, thus the tines 24 will not move further upward, not even if crop material would exert a further upward pressure.

From a comparison of FIGS. 7 and 8, it will be seen that for the same elevation of the windguard 18, the crossbar 26 is rotated to accommodate a temporary increase in the flow of crop material. The upper limit of motion of the free extremities 28 of the tines 24 is restricted by tension of the flexible tie 34. It can be seen form FIG. 8 that, upon a temporarily increased flow of crop material, the vertical depth d of the crop flow path 25 is increased.

When the temporary increase in the flow of crop material reduces or disappears, the upward pressure on the tines 24 reduces as well. This makes the tines 24 rotate back downwardly, in a clockwise direction for the embodiment as viewed in FIGS. 7 and 8. This rotation of the tines 24 entails a rotation of the crossbar 26 to which the tines 24 are fixedly attached. This rotation of the crossbar 26 in turn entails a corresponding rotation of the crank arm 30 to which the crossbar 26 is fixedly attached, possibly back to the situation illustrated in FIG. 7. The rotation of the crank arm 30 due to lowering of the tines 24 provides some slack on the flexible tie 34, while the flexible tie 32 may become taut. This prevents further rotation of the crank arm 30, thus preventing further rotation of the crossbar 26, in turn preventing further rotation and hence downward movement of the extremities 28 of the tines 24.

Figure 9:
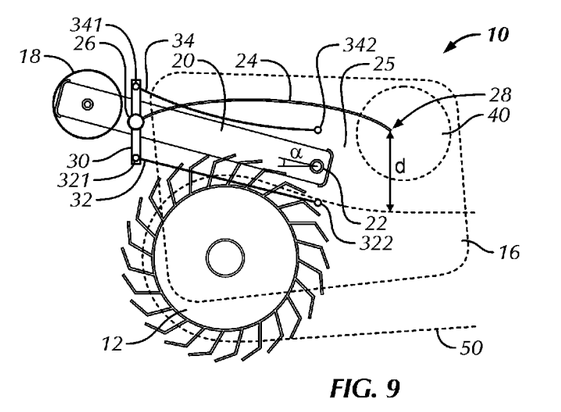
FIG. 9 shows the pick-up assembly of FIGS. 7 and 8 when the windguard is raised in accordance with embodiments of the present invention to accommodate an increased crop flow rate.

In case an increased crop flow rate is not a temporary increase but lasts longer, the windguard 18 may be pushed in a raised position by the harvested crop material, as illustrated in FIG. 9. Also in the raised position of the windguard 18, as illustrated in FIG. 9, the crossbar 26 and the tines 24 take on a particular position, determined by the fact that flexible tie 32 is taut, as illustrated, and hence does not allow crank arm 30 to rotate so as to allow the tines 24 to move their extremities 28 further downwardly. In this position, the crank arm 30 may be placed substantially vertical, e.g. vertical. The flexible tie 32 at the bottom part, e.g. at the bottom extremity, of the crank arm 30 is tightened, while the flexible tie 34 at the top part, e.g. at the top extremity, of the crank arm 30 is provided with some slack. It can be seen from comparison with FIG. 3 that, due to the limitation on the rotation of the crossbar 26 by limiting the rotation of crank arm 30 due to the flexible tie 32 being taut in accordance with embodiments of the present invention, the vertical depth d of the crop flow path 25 is increased.

Figure 10:
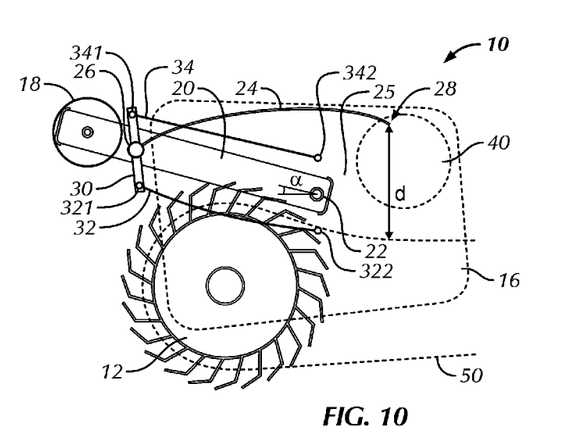
FIG. 10 shows the pick-up assembly of FIG. 9 when the tines of the windguard are raised in accordance with embodiments of the present invention to accommodate an a sudden temporary increase in crop flow rate.

In FIGS. 9 and 10 the pick-up assembly 10 according to embodiment of the present invention is shown in a raised position of the windguard 18, while in FIGS. 7 and 8 the pick-up assembly 10 according to embodiments of the present invention is illustrated in a lowered position of the windguard 18. Comparison of FIGS. 7 and 9, with FIGS. 8 and 10, respectively, shows an increase of the depth d of the crop flow path 25 in the raised position, therefore the funnel effect present in the conventional pick-up assembly is avoided (compare FIG. 3).

FIG. 10 shows the pick-up assembly of FIG. 9 when the tines 24 of the windguard 18 are raised to accommodate a sudden temporary increase in crop flow rate. The crop flow pushes the tines 24 upwardly. This upward movement of the tines 24 makes the crossbar 26, to which the tines 24 are fixedly connected, rotate with respect to the support arms 20, in a counterclockwise direction for the embodiment as viewed in FIGS. 9 and 10. As a crank arm 30 is secured to the crossbar 26 in accordance with embodiments of the present invention, this crank arm 30 will undergo a same rotational movement as the crossbar 26, which is a rotation in a counterclockwise direction for the embodiment as viewed in FIGS. 9 and 10. The rotation of the crank arm 30, however, is limited by the flexible ties 32, 34. In the embodiment illustrated and described hereinabove, the flexible tie 34 at the top part, e.g. at the top extremity, will become taut, thus preventing further rotation of the crank arm 30. As the further rotation of the crank arm 30 is prevented, also further rotation of the crossbar 26 is prevented, thus the tines 24 will not move further upward, not even if crop material would exert a further upward pressure. The only thing the crop material can do, is to make the windguard 18 further raise (if still possible in view of its configuration), due to the pressure exerted. If the windguard is further raised, the angle α increases, which will allow the tines 24 to further rotate upwardly.

From a comparison of FIGS. 9 and 10, it will be seen that for the same elevation of the windguard 18, the crossbar 26 is rotated to accommodate a temporary increase in the flow of crop material. The upper limit of motion of the free extremities 28 of the tines 24 is restricted by tension of the flexible tie 34. It can be seen form FIG. 8 that, upon a temporarily increased flow of crop material, the vertical depth d of the crop flow path 25 is increased.

Similarly as in the case of the lowered windguard 18, when the temporary increase in the flow of crop material reduces or disappears, the upward pressure on the tines 24 reduces as well. This makes the tines 24 rotate back downwardly, in a clockwise direction for the embodiment as viewed in FIGS. 9 and 10. This rotation of the tines 24 entails a rotation of the crossbar 26 to which the tines 24 are fixedly attached. This rotation of the crossbar 26 in turn entails a corresponding rotation of the crank arm 30 to which the crossbar 26 is fixedly attached, possibly back to the situation illustrated in FIG. 9. The rotation of the crank arm 30 due to lowering of the tines 24 provides some slack on the flexible tie 34, while the flexible tie 32 may become taut. This prevents further rotation of the crank arm 30, thus preventing further rotation of the crossbar 26, in turn preventing further rotation and hence downward movement of the extremities 28 of the tines 24.

Figure 11:
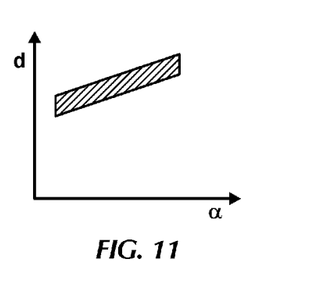
FIG. 11 shows the relationship between the angle $\alpha$ and the height d for embodiments of the present invention as for example shown in FIGS. 7-10.

The relationship between the angle α and the depth d of the crop flow path 25 is graphically depicted in FIG. 11. This graph shows an increase in vertical depth d of the crop flow path 25 for increasing angles α, i.e. when the windguard 18 is brought in a higher position with respect to the drum 12, combined with a restriction of the depth d of the crop flow path 25 within predetermined limits for a fixed angle α to accommodate sudden and temporary surges in crop flow.

Figure 12:
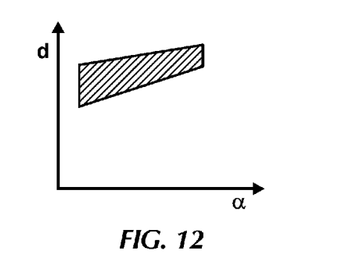
FIG. 12 shows the relationship between the angle $\alpha$ and the height d for embodiments of the present invention wherein the upper limit and the lower limit of the range of motion of the tines increase at different rates when the angle $\alpha$ increases.

According to embodiments of the present invention, the slope of the lower and upper limit of the crop flow depth d in function of the angle α can be controlled independently by adjusting the position of the fixation location of the ends 321, 341, 322, 342 of the first and second flexible ties 32, 34 with respect to the rotation axes of the crossbar 26 and of the arms 20, and the length of the flexible ties 32 and 34, allowing for example for larger surges in crop flow when the windguard 18 is lowered. This is depicted in FIG. 12.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

The invention claimed is:

1. A pick-up assembly for an agricultural machine comprising:
   a pick-up drum rotatably mounted in a frame;
   a windguard extending transversally to an intended direction of crop flow mounted at least one of forward and above the drum at a free end of two lateral support arms, the two lateral support arms being pivotably mounted at their other end to the frame;
   a crossbar extending transversally to the intended direction of crop flow, the crossbar comprising a plurality of tines mounted at one end to the crossbar and projecting with their free end downstream in the intended direction of crop flow, the crossbar being pivotably mounted to the two lateral support arms for allowing a range of free movement of the free end of the tines between an upper limit and a lower limit; and
   two elongate flexible tension elements being connected at one end to the crossbar and at their other end to the frame, the ends of the tension elements connected to the crossbar being on opposite sides of the crossbar, a change in an angle of rotation of the support arms causing one of the tension elements to tighten and the other of the tension elements to slacken, the upper limit of the range of movement of the tines being reached when one of the tension elements is taut and the lower limit of the range of movement of the tines being reached when the other tension element is taut.

2. A pick-up assembly according to claim 1, wherein the tension element comprises a cord, a cable or a chain.

3. A pick-up assembly according to claim 1, wherein the lower limit of the range of movement of the tines is controlled such that a height of the crop flow path in the vicinity of the free ends of the tines does not decrease when the angle of rotation of the support arms increases.

4. A pick-up assembly according to claim 1, wherein the upper limit of the range of movement of the tines is controlled such that a height of the crop flow path in the vicinity of the free ends of the tines does not decrease when the angle of rotation of the support arms increases.

5. A pick-up assembly according to claim 1, wherein both ends of the tension elements are connected at a same side of a plane defined by the crossbar and an axis of rotation of the support arms.

6. A pick-up assembly according to claim 1, wherein the two elongate flexible tension elements connected at one end to the crossbar are both connected to a single crank arm.

7. A pick-up assembly according to claim 6, wherein the crank arm is fixedly connected to the crossbar.

8. A pick-up assembly according to claim 1, wherein the tines are fixedly connected to the crossbar.

9. A pick-up assembly according to claim 1, wherein the two elongate flexible tension elements are a first tension element and a second tension element, wherein the end of the first tension element connected to the crossbar is below the crossbar and the end of the second tension element connected to the crossbar is above the crossbar.

* * * * *